(12) United States Patent
Ferrier

(10) Patent No.: US 8,907,576 B2
(45) Date of Patent: Dec. 9, 2014

(54) LINEAR BYPASS ELECTRICAL CIRCUIT FOR DRIVING LED STRINGS

(71) Applicant: Lumenetix, Inc., Scotts Valley, CA (US)

(72) Inventor: Herman Ferrier, Scotts Valley, CA (US)

(73) Assignee: Lumenetix, Inc., Scotts Valley, CA (US)

( * ) Notice: Subject to any disclaimer, the term of this patent is extended or adjusted under 35 U.S.C. 154(b) by 17 days.

(21) Appl. No.: 13/868,984

(22) Filed: Apr. 23, 2013

(65) Prior Publication Data

US 2014/0210361 A1     Jul. 31, 2014

Related U.S. Application Data

(60) Provisional application No. 61/757,600, filed on Jan. 28, 2013.

(51) Int. Cl.
    *H05B 37/00*         (2006.01)
    *H05B 33/08*         (2006.01)

(52) U.S. Cl.
    CPC ................... *H05B 33/0812* (2013.01)
    USPC .......... 315/186; 315/185 R; 315/122; 315/294

(58) Field of Classification Search
    USPC ............. 315/185 R, 186, 122, 192, 193, 201, 315/294, 307–308
    See application file for complete search history.

(56) References Cited

U.S. PATENT DOCUMENTS

| | | | |
|---|---|---|---|
| 7,339,323 B2 * | 3/2008 | Bucur | 315/128 |
| 7,439,945 B1 * | 10/2008 | Awalt et al. | 345/83 |
| 7,683,553 B2 * | 3/2010 | Fong | 315/185 R |
| 2012/0306375 A1 * | 12/2012 | van de Ven | 315/122 |
| 2013/0207559 A1 * | 8/2013 | Ferrier | 315/192 |

\* cited by examiner

*Primary Examiner* — Vibol Tan
(74) *Attorney, Agent, or Firm* — Perkins Coie LLP

(57) ABSTRACT

An electrical circuit for driving a light emitting diode (LED) string is described. The electrical circuit includes a first LED string having one or more color LED strings. A first current control transistor is coupled in series with the first LED string. A color bypass transistor may couple in parallel to one of the one or more color LED strings. A second LED string may also be coupled to the first LED string at an anode terminal of both LED strings. The second LED string may be coupled in parallel with a string bypass transistor and in series with a second current control transistor. Connection interfaces to control terminals of the first current control transistor, the color bypass transistor, the second current control transistor, and the string bypass transistor enable a control device to operate these transistors in linear mode to drive the LED strings.

31 Claims, 10 Drawing Sheets

LINEAR BYPASS ELECTRICAL CIRCUIT FOR DRIVING LED STRINGS

CROSS-REFERENCES TO RELATED APPLICATIONS

This application claims the benefit of U.S. Provisional Application No. 61/757,600, entitled "LINEAR BYPASS ELECTRICAL CIRCUIT FOR DRIVING LED STRINGS", filed Jan. 28, 2013, and is hereby incorporated by reference in its entirety.

This application is related to and incorporates by reference in its entirety U.S. Provisional Application No. 61/577,842, entitled "LINEAR BYPASS ELECTRICAL CIRCUIT FOR DRIVING LED STRINGS", filed Dec. 20, 2011.

This application is related to and incorporates by reference in its entirety U.S. application Ser. No. 13/717,594, entitled "LINEAR BYPASS ELECTRICAL CIRCUIT FOR DRIVING LED STRINGS", filed Dec. 17, 2012.

This application is related to and incorporates by reference in its entirety U.S. patent application Ser. No. 12/782,038, entitled "LAMP COLOR MATCHING AND CONTROL SYSTEMS AND METHODS", filed May 18, 2010.

BACKGROUND

A light-emitting diode (LED) emits incoherent narrow-spectrum light when the diode is electrically biased in the forward direction of the p-n junction inside of the diode. LEDs typically have higher luminous efficacy, i.e., lumens per watt, than conventional light sources such as incandescent bulbs. LEDs are often used in battery powered or energy saving devices, and are becoming increasingly popular in higher power applications such as, for example, flashlights, area lighting, and regular household light sources.

Due to the emitting spectrum nature of the LEDs, the quality of the light is a primary consideration with the use of LEDs in higher-power applications. It is desirable to have high brightness white LED device that has better light quality, which is quantitatively measured by the color rendering index (CRI). The CRI is a measure of how true the light is as compared to an ideal or natural light source in representing the entire light spectrum. An ideal or natural light source has a high CRI of, for example, 100. Individual white LED typically has a poor CRI, in the approximate range of 70-80, because of their emitting spectral concentration. To partially remedy the problem, phosphors are utilized to convert the wavelength of the light emitted from the diode to other wavelength regions. Furthermore, LEDs with different emitting colors mixed to produce a white light better filling out the light spectrum. For example, combinations of white, amber, red, and green LEDs can provide light with CRIs at or above 90.

Combinations of LEDs having different emitting light colors may include multiple strings of LEDs having the same emitting light color. There are conventional approaches for modulating the light output from each string of LEDs having the same emitting light color. One approach is to provide a constant current source and turn the string of LEDs on and off over a particular duty cycle to change the perceived light intensity of that string. This is achieved by using switch-mode transistors switching on and off at a high frequency. The approaches are used not only to change the relative intensity of LEDs with different colors but also to raise and lower the overall intensity of the string in a manner similar to a dimming function. Although the approach provides the color control, it has significant efficiency penalties.

This approach uses a current source for each LED string and modulates the duty cycle of the LED string at a frequency imperceptible to the human eye. But, running the LEDs at their full current rating and duty cycling their outputs is typically less efficient than simply running the LEDs continuously at a lower current, because LED efficiency declines with increasing current.

Furthermore, the switching circuit introduces electromagnetic interference (EMI), whose disadvantage cannot be understated. To filter and screen the EMI, more components need to be taken into account, driving up the parts cost.

Moreover, the incandescence emission from a conventional incandescent light bulb is a black body radiation. Its emission spectrum conforms to the Planckian locus on the CIE color space. When dimming an incandescent light bulb, customers are used to the color temperature changing according to the black body radiation. Therefore, it is desirable to mimic the color temperature change conforming to the Planckian locus when dimming a light source. However, an LED barely shifts its emission spectrum when the pass-through current reduces. Therefore, when dimming a LED-based lighting fixture, a user does not observe the color shift as he is used to.

The foregoing examples of the related art and limitations related therewith are intended to be illustrative and not exclusive. Other limitations of the related art will become apparent upon a reading of the specification and a study of the drawings.

SUMMARY

Introduced herein is an electrical circuit for driving LED strings in a lamp for providing a dimming of the lamp. The electrical circuit comprises a first and a second LED strings, a first and a second transistors, and at least one bypass transistor. The first LED string includes at least one LED. The first transistor is coupled to the first LED string at a first terminal of the first transistor. The first transistor is capable of operating in a linear mode during operation of the electrical circuit. The second LED string includes a plurality of color strings. Each of the color strings includes at least one LED. The color strings are coupled in series. The first LED string and the second LED string are coupled in parallel. The second transistor is coupled to the second LED string at a first terminal of the second transistor. The second transistor is capable of operating in a linear mode during operation of the electrical circuit. The bypass transistor is coupled to one of the color strings. The bypass transistor is capable of operating in a linear mode during operation of the electrical circuit. A first terminal of the bypass transistor is coupled to a first terminal of the color string. The second terminal of the bypass transistor is coupled to a second terminal of the color string.

Control terminal voltages (e.g. gate terminal voltage or base terminal voltage) of the transistors can be controlled during operation of the electrical circuit so that the first transistor, the second transistor and the bypass transistor are operating in the linear modes. The control terminal voltages can be controlled by a control device. The control device can be part of a separate module that can link up to the electrical circuit described above. The control device can be a mechanical switch, an analog function generator, a controller, a multi-position potentiometer, or other means of switching voltage outputs. The changes in the gate voltages of the transistors in turn can change the output color temperatures of the LED strings. The control terminal of each linear-mode transistor can further be coupled to a thermistor voltage divider. The thermistor voltage dividers allow color ratios of the color strings controlled by the electrical circuit to remain the same despite fluctuations in the operating temperature of the LEDs in the color strings.

The design of this modular electrical circuit enables an unexpected advantage of a visually appeasing dimming of the LED strings capable of mimicking black body radiation at high efficiency, while minimizing EMI. Because the gate voltages of the transistors can be controlled by a control device, digital controllers and processors are not needed in order to perform the dimming operation. This advancement presents a low cost alternative to dimming of LED-based lamps suitable to replace the dimmable incandescent light bulbs.

The techniques introduced here further have an unexpected advantage of minimizing the electromagnetic interference (EMI), and eliminating the need for inductors in the circuit. The disclosed electronic circuit can operate from a standard TRIAC dimmable constant current power supply, optimize the power efficiency, and have built-in ability to adjust the intensity and the emitting light color characteristics, such as color temperature and color rendering index.

By controlling the current ratio between white and color LED strings, and bypassing some of the current from one or more color strings, the color temperature of the dimming output light can be fine-tuned to conform to the Planckian locus, mimicking the behavior of a conventional incandescent light bulb under dimming.

This Summary is provided to introduce a selection of concepts in a simplified form that are further described below in the Detailed Description. This Summary is not intended to identify key features or essential features of the claimed subject matter, not is it intended to be used to limit the scope of the claimed subject matter.

BRIEF DESCRIPTION OF THE DRAWINGS

One or more embodiments of the present invention are illustrated by way of example and are not limited by the figures of the accompanying drawings, in which like references indicate similar elements.

DETAILED DESCRIPTION

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description. Although the diagrams depict components as functionally separate, such depiction is merely for illustrative purposes. It will be apparent to those skilled in the art that the components portrayed in this figure may be arbitrarily combined or divided into separate components.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

References in this specification to "an embodiment," "one embodiment," or the like mean that the particular feature, structure, or characteristic being described is included in at least one embodiment of the present invention. Occurrences of such phrases in this specification do not necessarily all refer to the same embodiment.

Figure 1:
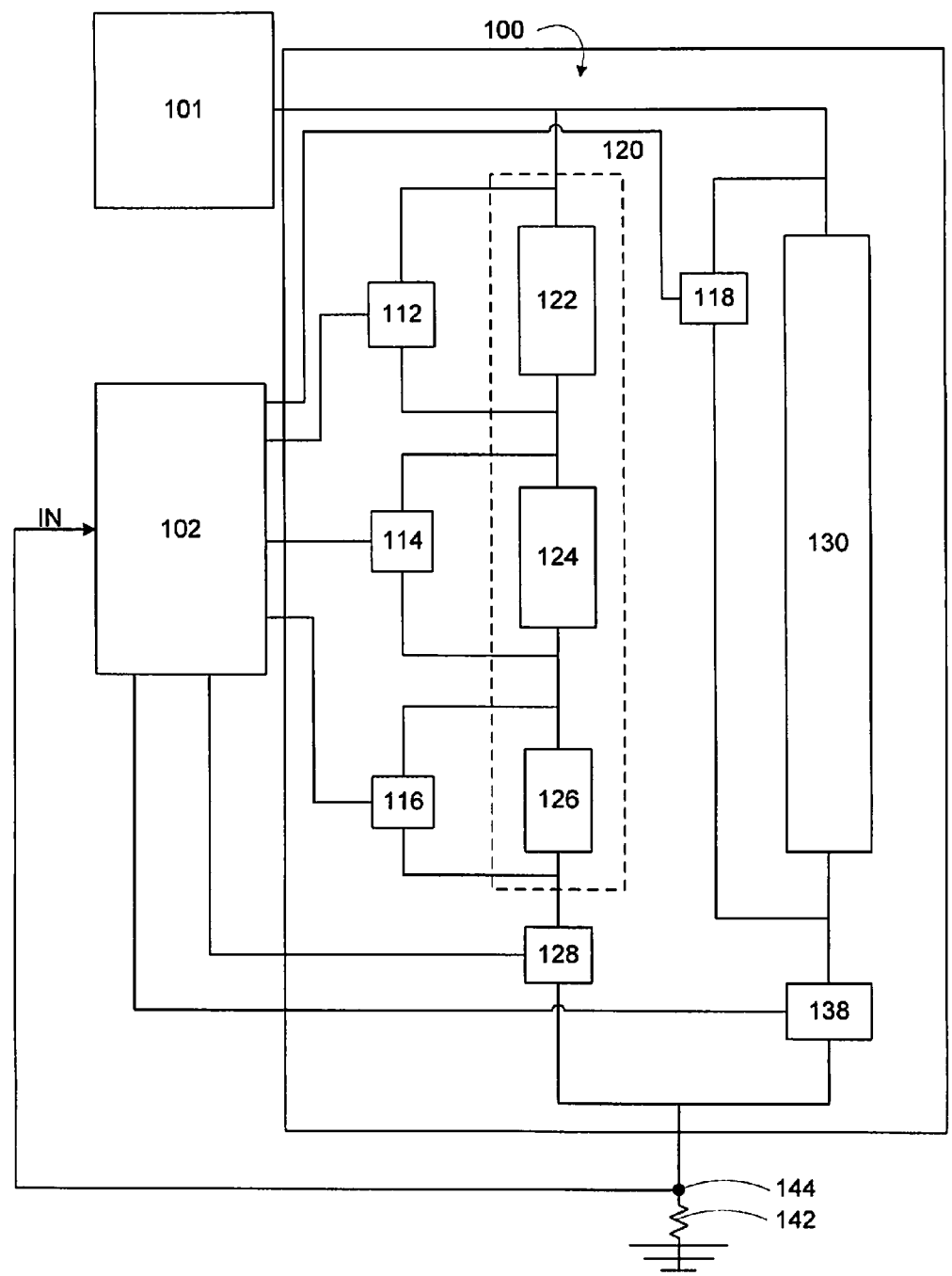
FIG. 1 depicts a block diagram of an electrical circuit coupled to a control device for driving LED strings according to one embodiment of the disclosure.

FIG. 1 depicts a block diagram of an electrical circuit 100 coupled to a control device 102 for driving LED strings according to one embodiment of the disclosure. The electrical circuit 100 includes an LED string 120. The LED string 120 includes one or more color strings, e.g., 122, 124 and 126 (collectively "color strings 122 through 126"). Each of the color string contains one or more LEDs. A linear mode transistor 128 is coupled directly to color string 126 in series. The electrical circuit 100 further includes an LED string 130 and a linear mode transistor 138 coupled in series. The LED string 130 contains one or more LEDs. As illustrated in FIG. 1, the series of 122-124-126-128 and the series of 130-138 are coupled in parallel. A power supply 101 is coupled to both LED string 130 and color string 122 to supply power to the LED string 130 and color strings 122, 124 and 126. The power supply 101 can be external to the electrical circuit 100 or integrated as part of the electrical circuit 100. As shown in FIG. 1, for each of the color strings 122, 124, 126, a bypass linear mode transistor (112, 114, 116) is coupled to the corresponding color string (122, 124, 126), respectively. As shown in FIG. 1, first and second terminals of each bypass linear mode transistor (112, 114, 116) are respectively coupled to the first and second terminals of each corresponding color string (122, 124, 126). A bypass linear mode transistor 118 is coupled to LED string 130 in parallel. The first and second terminals of bypass linear mode transistor 118 are respectively coupled to the first and second terminals of LED string 130. A bypass linear mode transistor is a linear mode transistor used to bypass a portion or all of the current from a load. Other embodiments may have fewer or more color strings and/or bypass linear mode transistors. The control device 102 is coupled to and is configured to control the linear mode transistors 128, 138 and bypass linear mode transistors 112, 114, 116, 118.

A linear mode transistor is an electrical regulator based on a transistor, such as a field effect transistor (FET), bipolar junction transistor (BJT), metal oxide semiconductor field effect transistor (MOSFET), or insulated gate bipolar transistor (IGBT), operating in its linear dissipative mode (also sometimes referred to as linear mode, linear region, triode mode, or ohmic mode). For example, the linear mode transistor may be a metal oxide semiconductor field effect transistor (MOSFET) operating in linear mode, i.e. the gate-source voltage is higher than the threshold voltage, and the drain-source voltage is higher than the difference between the gate-source voltage and the threshold voltage. In the linear mode, the transistor is turned on, and a channel has been created which allows current to flow between the drain and the source. The MOSFET operates like a resistor, controlled by the gate voltage relative to both the source and drain voltages. The relationship of the drain-source voltage and the drain current are relatively close to a linear form. A bypass linear mode transistor is a linear mode transistor used to bypass a portion or all of the current from a load. By controlling the gate voltage of the bypass linear mode transistor, the circuit can control how much current it wants to bypass from the load. A linear mode transistor is different than a switching transistor (also referred to as switch, or switcher) which is based on a transistor forced to act as an on/off switch (also referred to as saturation mode, or active mode).

There are two major types of transistors, bipolar transistors and field effect transistors. The terminals are labeled differently between these two types. A bipolar transistor has terminals labeled as base, collector, and emitter. A field effect transistor has terminals labeled as gate, source, and drain. For purposes of explanation, a transistor is commonly described herein as a field effect transistor; however, a transistor can also be any transistor including bipolar transistor. Similarly for purposes of explanation, a controlling terminal (also referred to as third terminal or a control terminal) of a transistor is commonly described herein as a gate terminal of a field effect transistor (a small current from base to emitter can control current between the collector and emitter terminals); however, a controlling terminal can also be a base terminal of a bipolar transistor (a voltage at the gate can control a current between source and drain). In this disclosure, a first or second terminal of the transistor means a source or drain terminal in case of a field effect transistor, or a collector or emitter terminal of a bipolar transistor. The two terminals of a transistor that is not a controlling terminal may be termed a non-controlling anode terminal (i.e. where current flows into the transistor), and a non-controlling cathode terminal (i.e. where current flows out of the transistor).

In one embodiment, the power supply 101 is a DC power supply having a voltage output range and a current output range. During operation, power supply 101 provides power to LED string 130 and LED string 120, which includes color strings 122, 124, 126. In one embodiment, control device 102 is configured with preset voltage outputs to control the linear mode transistors 112, 114, 116, 118, 128 and 138. In one embodiment, the preset voltage outputs for controlling the linear mode transistors 112, 114, 116, 118, 128, 138 can be calculated based upon an algorithm described in U.S. patent application Ser. No. 12/782,038, entitled "LAMP COLOR MATCHING AND CONTROL SYSTEMS AND METHODS", filed May 18, 2010, where the luminous flux output of each color string is adjusted incrementally but still retaining a constant total output luminous flux from all of the LED strings. The currents drawn through each color string can be adjusted via switches in the control device 102. The control device 102 may be a mechanical switch, such as a switch coupled to voltage dividers, a multi-position potentiometer, or other means of switching between voltage outputs. The control device 102 may also be an analog function generator. In some embodiments, the control device 102 may be integrated with the electrical circuit 100. In other embodiments, the control device 102 is a modular device that may be portably coupled to the electrical circuit 100.

The control device 102 can have one or more switch devices therein. For example, the control device 102 can have switches that adjust the gate voltages of the linear mode transistors. The control device 102 can include a plurality of operating states. In one embodiment, each state of the control device can adjust/switch all of the linear mode transistors' gate voltages simultaneously. In that embodiment, each state of the switches can correspond to a correlated color temperature of the LED strings. For example, the control device 102 can provide the option of three colors/correlated color temperatures (CCT) for the light emission from the LED strings. In a production setting, pre-selected CCTs (such as 2700, 3500, 4000 CCT) can be designed into the control device 102 for each lamp unit associated with the electric circuit 100. The gain on the various linear circuits can be matrixed to accept the simple presets. In other embodiments, each of the multiple switches of the control device can adjust one of the gate voltages of the linear mode transistors.

In another example, the control device 102 is an analog function generator receiving current flow feedback from the electrical circuit 100. In one example, the current flow feedback may be derived from a pre-ground resistor 142. The pre-ground resistor 142 is coupled in series with the LED strings in the electrical circuit 100 on one end and a circuit ground on the other end. Current flowing through the pre-ground resistor 142 substantially matches current flowing out of the power supply 101, such as a current source. The power supply 101 may be an adjustable current source. For example, the power supply 101 may be similar to traditional halogen lamps having adjustable current sources to dim the halogen lamps. The pre-ground resistor 142 converts the current flow to a voltage reference point 144. The feedback mechanism utilizes the voltage reference 144 to generate different analog functions for the controlling terminals of each linear mode transistors in the electrical circuit 100. The analog function generator is designed specifically to apportion currents running through specific color strings in order to emulate a blackbody emitter as the power supply 101 is dimmed.

Each of color strings 122, 124, 126 has at least one LED. In some embodiments, one or more of color strings 122, 124, 126 may have a plurality of LEDs. Thus, color strings 122, 124, 126 may have a different number of LEDs. In various embodiments, the LEDs of each of color strings 122, 124, 126 may be placed in various physical orientations. Additionally, in some embodiments the LEDs of color strings 122, 124, 126 may share a similar physical orientation. Furthermore, the LEDs of each of color strings 122, 124, 126 may be configured to emit light in various colors.

In some embodiments, the LEDs of each of color strings 122, 124, 126 are electrically coupled in series. In such embodiments, given that color strings 122, 124, 126 themselves are coupled in series as shown in FIG. 1 and described above, the LEDs of all of color strings 122 through 126 are coupled in series. Thus, in such embodiments, the LEDs of all of color strings 122, 124, 126 present a high string voltage drop that is the sum of their individual voltage drops. Power supply 101, providing power to color strings 122, 124, 126 as described above, may thus provide a similarly high supply voltage. In doing so, power supply 101 therefore exhibits higher efficiency. In some embodiments, some of the LEDs of one or more color strings are electrically coupled in parallel.

LED string 130 has at least one LED. In some embodiments, LED string 130 may have a plurality of LEDs. In some embodiments, the LEDs of LED string 130 may be configured to emit white light. In some embodiments, the LEDs of LED string 130 are electrically coupled in series. Thus, in such embodiments, the LEDs of LED string 130 present a string voltage drop that is the sum of their individual voltage drops. In some embodiments, the number of the LEDs of LED string 130 are arranged so that the total voltage drop of LED string 130 is substantially similar to the total voltage drop of LED string 120. Thus, two LED strings 120 and 130, coupled in parallel, have matched voltage drops to achieve better energy efficiency.

Figure 2:
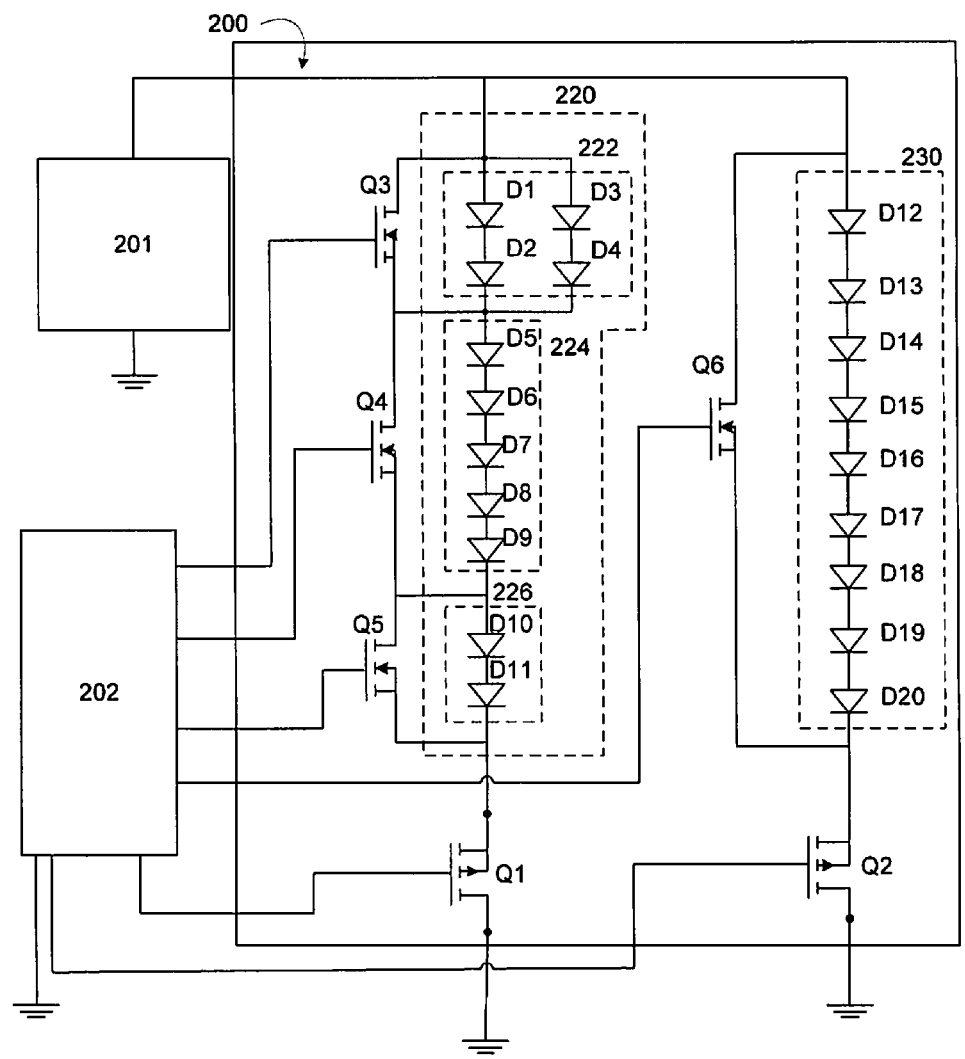
FIG. 2 depicts an electrical circuit coupled to a control device for driving LED strings according to one embodiment.

FIG. 2 depicts electrical circuit 200 coupled to a control device 202 for driving LED strings according to one embodiment of the disclosure. The electrical circuit 200 includes LED strings 220 and 230. LED strings 220 and 230 are coupled in parallel. The LED string 220 includes multiple color strings 222, 224 and 226 coupled in series (collectively "color strings 222 through 226"). Each of the color string contains one or more LEDs. Color string 222 includes LEDs D1, D2, D3 and D4. LEDs D1 and D2 are coupled in series. LEDs D3 and D4 are coupled in series. The two series are coupled in parallel. Color string 224 includes LEDs D5, D6, D7, D8 and D9 coupled in series. Color string 226 includes LEDs D10 and D11 coupled in series. The color strings may contain LEDs emitting light having different colors. In one embodiment, LEDs D1, D2, D3 and D4 are red-emitting LEDs; LEDs D5, D6, D7, D8 and D9 are amber-emitting LEDs; while LEDs D10 and 011 are blue-emitting LEDs. LED string 230 includes LEDs D12, D13, D14, D15, D16, D17, D18, D19 and D20. In one embodiment, all LEDs in LED string 230 are white-emitting LEDs. In some embodiments, some of the LEDs may emit light having other colors, such as cyan.

A linear mode transistor Q1 is coupled directly to color string 226 in series. Another linear mode transistor Q2 is coupled directly to LED string 230 in series. The linear mode transistors Q1 and Q2 may be connected to electrical ground. Alternatively, the linear mode transistor Q1 and Q2 may be each coupled in series with a resistor (not shown) connected to electrical ground. A power supply 201 is coupled to both LED strings 220 and 230 to supply power to the LEDs. In one embodiment, the power supply 201 has a current output from 100 mA to 2 A, with a maximum voltage of 40 volts. In some embodiments, the power supply 201 is a constant current power supply. In some other embodiments, the power supply 201 is a TRIAC dimmable constant current power supply. As shown in FIG. 2, for each of the color strings 222, 224, 226, a bypass linear mode transistor (Q3, Q4, Q5) is coupled to the corresponding color string (222, 224, 226), respectively. The first and second terminals of each bypass linear mode transistor (Q3, Q4, Q5) are respectively coupled to the first and second terminals of corresponding color string (222, 224, 226). A bypass linear mode transistor Q6 is coupled to LED string 230. The first and second terminals of bypass linear mode transistor Q6 are respectively coupled to the first and second terminals of LED string 230. A bypass linear mode transistor is a linear mode transistor used to bypass a portion or all of the current from a load. The control device 202 is coupled to and is configured to control the linear mode transistors Q1, Q2 and bypass linear mode transistors Q3, Q4, Q5, Q6. The control device 202 may control the gate voltages of the linear mode transistors so that the linear mode transistors are operating in their linear modes. In one embodiment, the linear mode transistors Q1, Q2, Q3, Q4, Q5 and Q6 may be linear-mode transistors, such as a field effect transistor or bipolar junction transistor, in linear mode.

In one embodiment, the power supply 201 is a DC power supply having a voltage output range and a current output range. The power supply 201 can be an external power supply or an integrated power supply. During operation, power supply 201 provides power to LED string 230 and LED string 220, which includes color strings 222, 224, 226. In one embodiment, control device 202 is configured with an algorithm to control the linear mode transistors Q1, Q2, Q3, Q4, Q5, Q6, such as the algorithms described above.

The control device 202 may control the color temperature of output light by adjusting one or more bypass linear mode transistors. In one embodiment, the linear mode transistors Q3, Q4, Q5 and Q6 may be field effect transistors operating in the linear dissipative mode. The field effect transistors Q3-Q6 provide for dimming of the LED with various emitting colors to achieve the desired light color characteristics. For example, by adjusting Q3 to bypass more current from the red-emitting color string 220, the color temperature increases to make the light color appear cooler. Or by adjusting Q5 to bypass more current from the blue-emitting color string 226, the color temperature decreases to make the light color appear warmer. Or by independently adjusting Q3, Q4, Q5 and Q6 to regulate the spectrum contribution from LEDs having different emitting colors, the color rendering index (CRI) can be tuned.

The numbers and the arrangement of LEDs having various emitting colors are designed to emit an output light with a mid-range color temperature, when all bypass linear mode transistors Q3-Q6 are completely off. In one embodiment, the mid-range color temperature may be about 5000 Kelvin. In another embodiment, the mid-range color temperature may be about 4000 Kelvin. In yet another embodiment, the mid-range color temperature may be from about 3500 Kelvin to about 5500 Kelvin. The efficiency loss due to the dissipation on linear mode transistors is minimum in this case. When an output light of different color temperature is needed, one or more bypass linear mode transistor starts to turn partially on to dim corresponding LEDs.

Series of D1, D2 and series of D3, D4 are coupled in parallel, so that the total string voltage drop in LED string 220 is about 9 times of a single LED voltage drop. Since LED string 230 contains 9 LEDs in series, the total string voltage drop in LED string 230 is the sum of LEDs' individual voltage drops. So the total voltage drop in LED string 230 is also about 9 times of a single LED voltage drop. Thus, in such embodiments, the total string voltage drop of LED string 230 is substantially similar to the total string voltage drop of LED string 220. Thus, two LED strings 220 and 230, coupled in parallel, have relatively matched voltage drops to achieve better energy efficiency.

The voltage drop of individual LED varies among LEDs. Therefore, the total string voltage drop of LED string 220 may not be exactly the same as the voltage drop of LED string 230. If there is no controlling mechanism, the difference between the parallel loads may cause most of the current to pass through one of the LED strings having higher voltage drop. This will cause poor light output performance and even LED failure due to the excessive current. In one embodiment, the control device 202 controls the operations of Q1 and Q2 such that at least one of Q1 and Q2 is fully on for most of the time. This mode of operation leads to minimum power loss while providing current apportioning between the LED strings.

Figure 3:
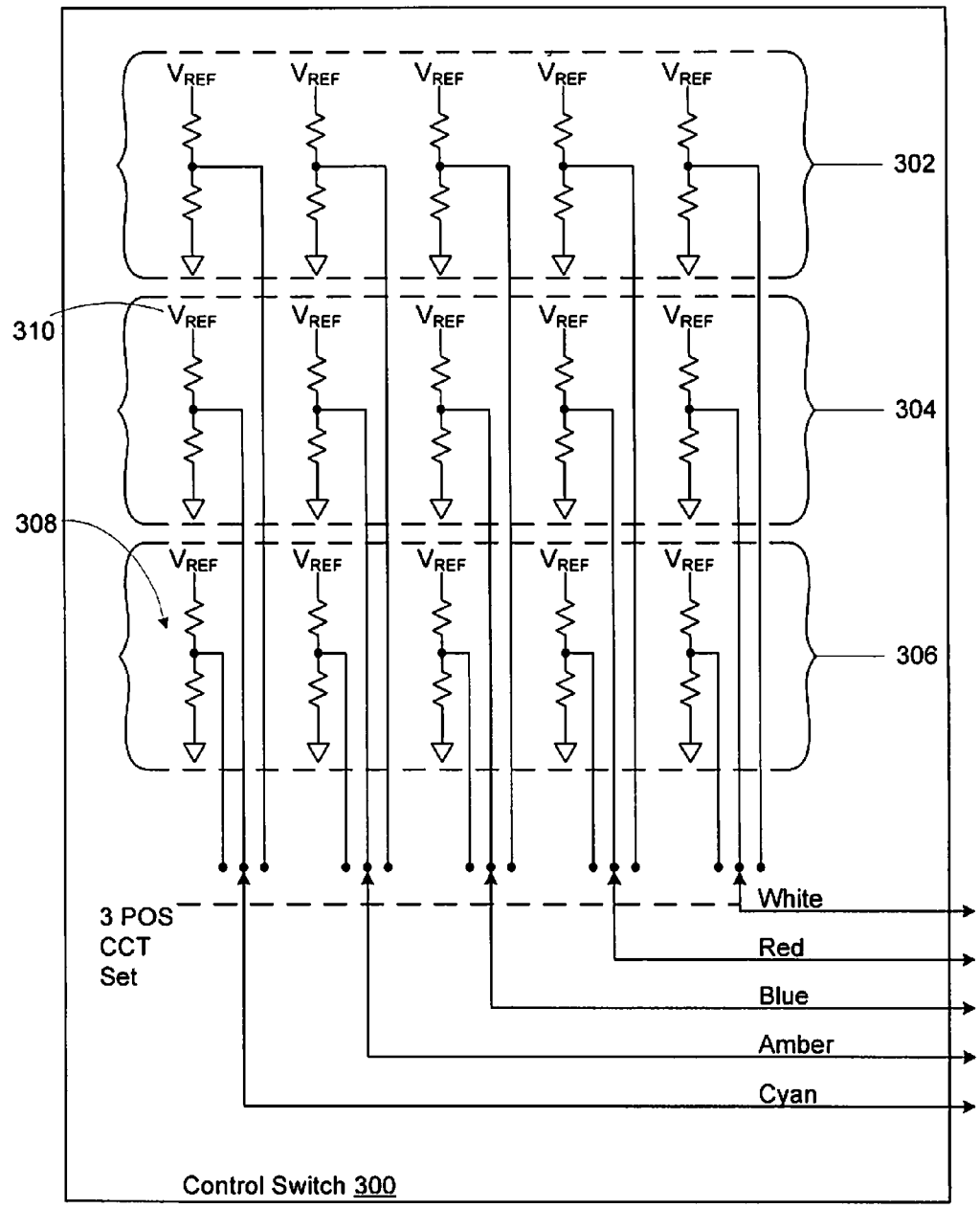
FIG. 3 illustrates an example of a control switch.

FIG. 3 illustrates an example of a control switch 300. The control switch 300 may be used as the control device 102 of FIG. 1. The control switch 300 may be toggled amongst two or more states, such as the 3 states as illustrated. Under each state, the control switch 300 may generate voltage reference points for an electrical circuit driving color LED strings, such the electrical circuit 100 of FIG. 1. In a first state, linear bypass transistors are coupled to a first set 302 of voltage sources. In a second state, the linear bypass transistors are coupled to a second set 304 of voltage sources. In a third state, the linear bypass transistors are coupled to a third set 306 of voltage sources.

The control switch 300 may generate voltage references points based which state it is in. The voltage reference points control linear bypass transistors for an electrical circuit driving color LED strings, such the electrical circuit 100 of FIG. 1, where the voltage reference points control the ratio of currents going to each color string and therefore illumination intensity ratios of each color. The illumination intensity ratios are then responsible for determining how close the overall illumination approximates illumination of a black body emitter.

In each set for each state of the control switch 300, there is a voltage divider 308 coupled to a voltage reference 310, such as a DC power supply. The voltage divider 308 may include two resistors coupled to each other with a terminal in between the two resistors for external connection, such as to a linear bypass transistor. One of the two resistors may be coupled to the voltage reference 310, while the other may be coupled to a circuit ground. The voltage reference 310 may be the power supply 101 of FIG. 1.

In some examples, there are as many terminals for external connections from the control switch 300 as there are color types in the electrical circuit that the control switch 300 is controlling. In the illustrated example, there are five external terminals from the control switch 300, each controlling a linear bypass transistor coupled parallel to a white color string, a red color string, a blue color string, an amber color string, or a cyan color string. When the control switch 300 moves from one state to another, the terminals for external connection changes its voltage states. Within each set of the voltage sources, the voltage ratios of the external terminal are configured based on current ratios configured to produce an illumination proximate to a black body emitter's correlated color temperature (CCT).

The incandescence emission from a conventional incandescent light bulb is a black body radiation. Its emission spectrum conforms to the Planckian locus on the CIE color space. When dimming an incandescent light bulb, customers are used to the color temperature change according to the black body radiation. Therefore, it is desirable to mimic the color temperature change conforming to the Planckian locus when dimming a LED based light source. By controlling the current ratio between white and color LED strings, and bypassing some of the current from one or more color strings, the color temperature of the dimming output light can be fine-tuned to conform to the Planckian locus, mimicking the behavior of a conventional incandescent light bulb under dimming.

Figure 4:
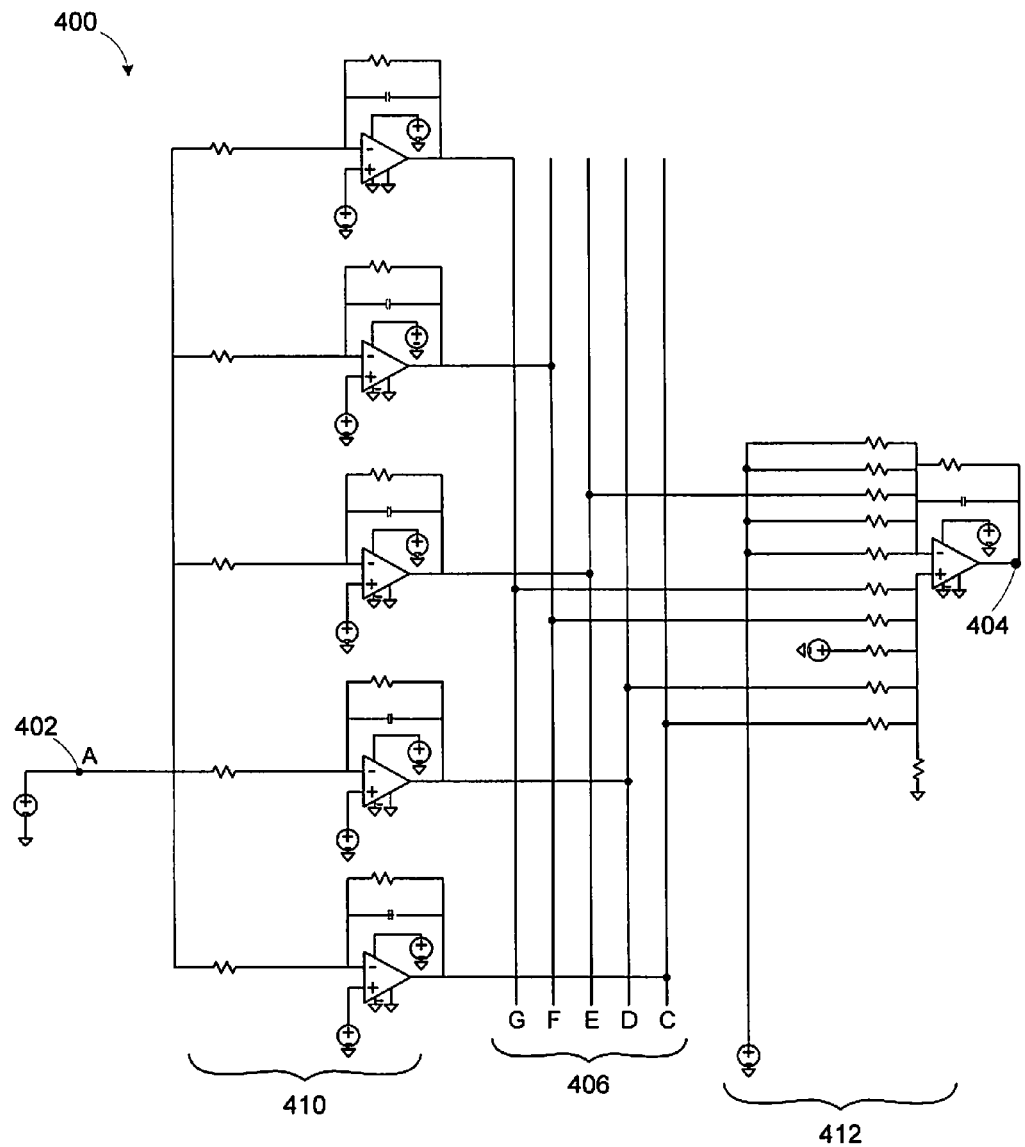
FIG. 4 illustrates an example of an analog function generator.

FIG. 4 illustrates an example of an analog function generator 400. The analog function generator 400 may be used as the control device 102 of FIG. 1. The analog function generator 400 may automatically generate voltage references points based on a total current supplied by a current source. The voltage reference points control linear bypass transistors for an electrical circuit driving color LED strings, such the electrical circuit 100 of FIG. 1, where the voltage reference points control the ratio of currents going to each color string and therefore illumination intensity ratios of each color. The illumination intensity ratios are then responsible for determining how close the overall illumination approximates illumination of a black body emitter.

The analog function generator 400 takes in an input voltage reference 402 and generate one or more output terminal voltages 404. The input voltage reference 402, for example, may be the voltage reference 144 of FIG. 1. The one or more output terminal voltages 404 may be combined from intermediary voltage references 406 generated by amplifier circuits 410. The amplifier circuits 410 may be connected in parallel to each other and in series with the input voltage reference 402. The amplifier circuits 410 are configured to saturate at different pre-determined voltage steps. Each intermediary voltage reference 406 corresponds to each amplifier circuit 410.

An adder circuitry 412 may add the intermediary voltage references 406 with different weights to generate an output terminal voltage 404. The different weights are configured by different resistors between the intermediary voltage references 406 and an adder amplifier of the adder circuitry 412. Because the intermediary voltage references 406 represent voltage step functions at different voltage levels, the adder circuitry 412 may linearly construct an analog signal as a function of the input voltage reference 402. The number of how many voltage steps in the output terminal voltage signal 404 is the same as the number of how many amplifier circuits 410 in the analog function generator 400. The number of the amplifier circuits 410 may be increased to have a smoother analog function for the output terminal voltage 404.

The amplifier circuits 410 may be coupled to more than one of the adder circuitry 412. For each adder circuitry 412, different weights (e.g. resistor sets) may be used to create different analog signal functions that changes as a function of input voltage steps. The output terminal voltages 404 may each be coupled to a linear bypass transistor in parallel to a color string, such as the linear transistors 112, 114, 116, or 118 of FIG. 1. The output analog signal of each adder circuitry 412 is designed with specific voltage ratio with each other, allowing the illumination intensity of color strings to increase without deviating from the color spectrum of a black body emitter.

Figure 5:
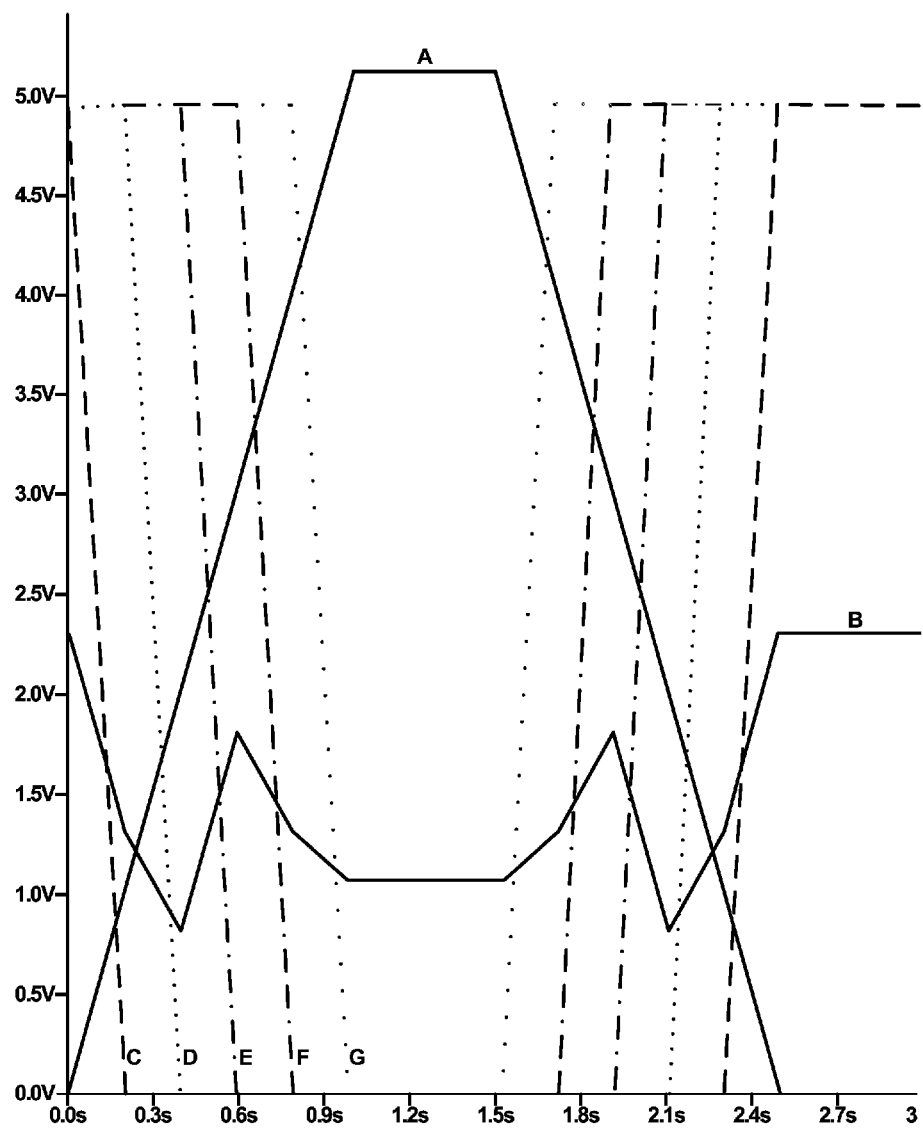
FIG. 5 illustrates an example of an output voltage signal of an analog function generator as a function of time given an input voltage reference signal.

FIG. 5 illustrates an example of an output voltage signal 502 of an analog function generator as a function of time given an input voltage reference signal 504. For example, the analog function generator may be the analog function generator 400 of FIG. 4. The input voltage reference signal 504 can represent a voltage signal of the input voltage reference 402 of FIG. 4. The output voltage signal 502 can be a voltage signal of the output terminal voltage 404 of FIG. 4.

As illustrated, the input voltage signal 504 may be linearly increased from 0.0V to 5.0V and back. In response, the output voltage signal 502 is generated by the analog function generator. As the input voltage signal 504 is increased, the output voltage signal 502 changes, linearly correlated with the input voltage signal 504. In the example, the linear correlation with the input voltage signal 504 changes in slope in lock steps (e.g. at steps 506, 508, 510, 512, and 514), where each step corresponds to where each of the amplifier circuits 410 saturates.

Figure 6A:
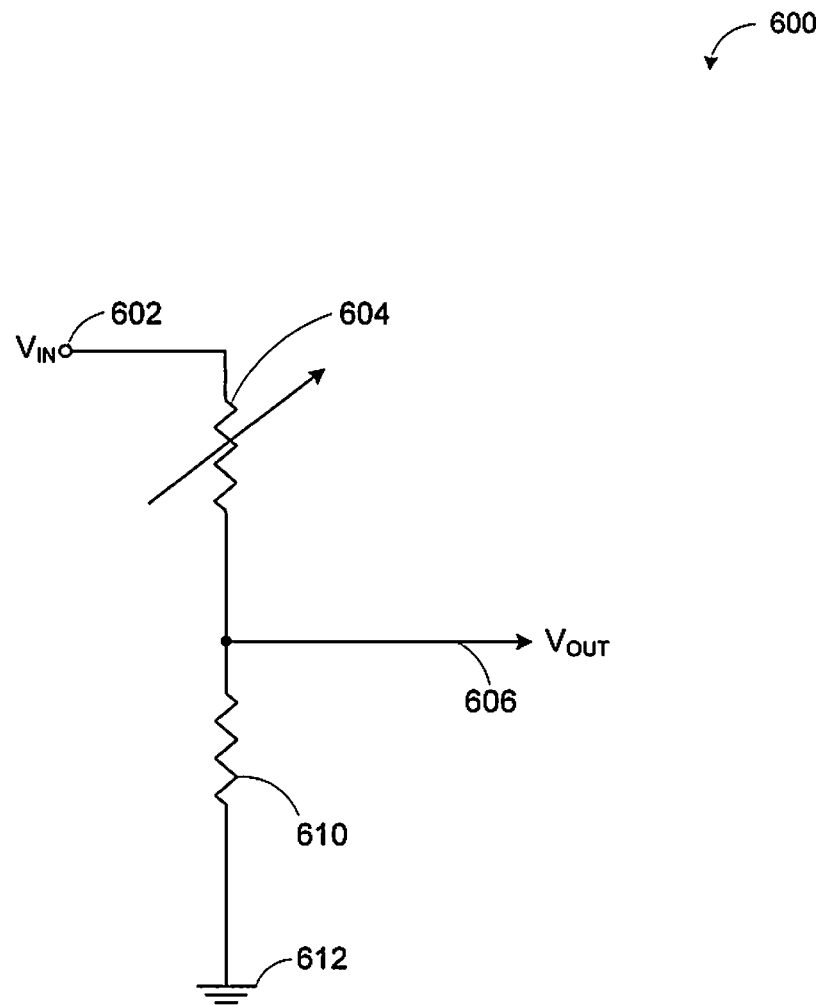
FIGS. 6A-6C illustrate examples of thermistor voltage dividers that may be coupled to a control terminal of a linear mode transistor parallel to a color string in the electric circuit of FIG. 1.
Figure 6B:
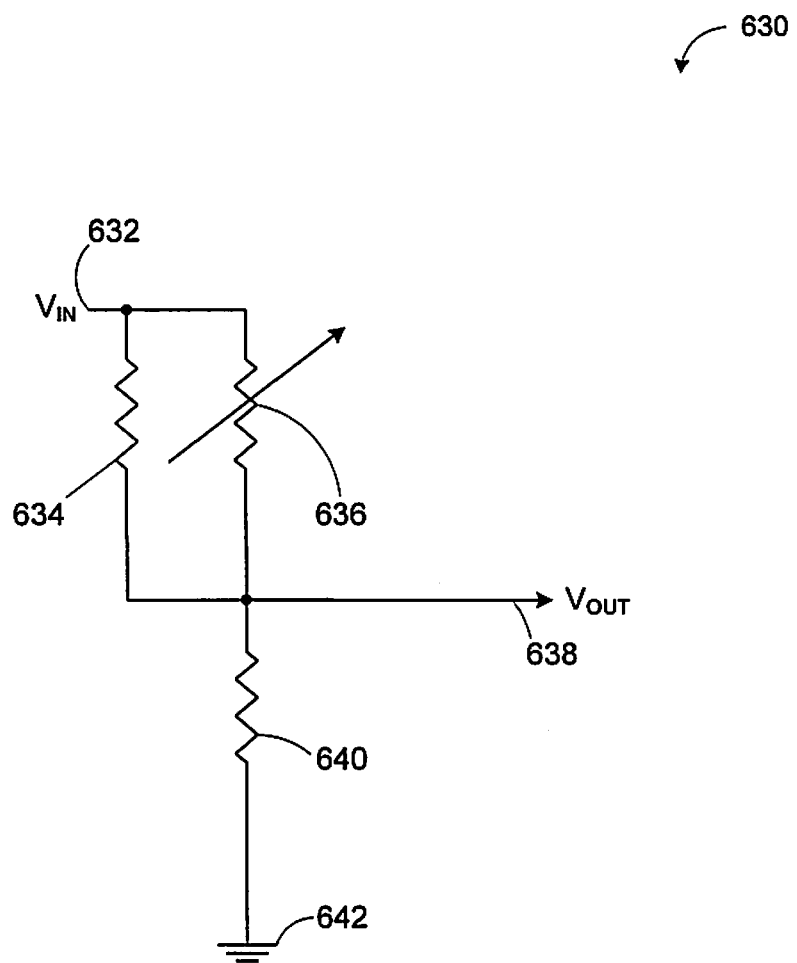
Figure 6C:
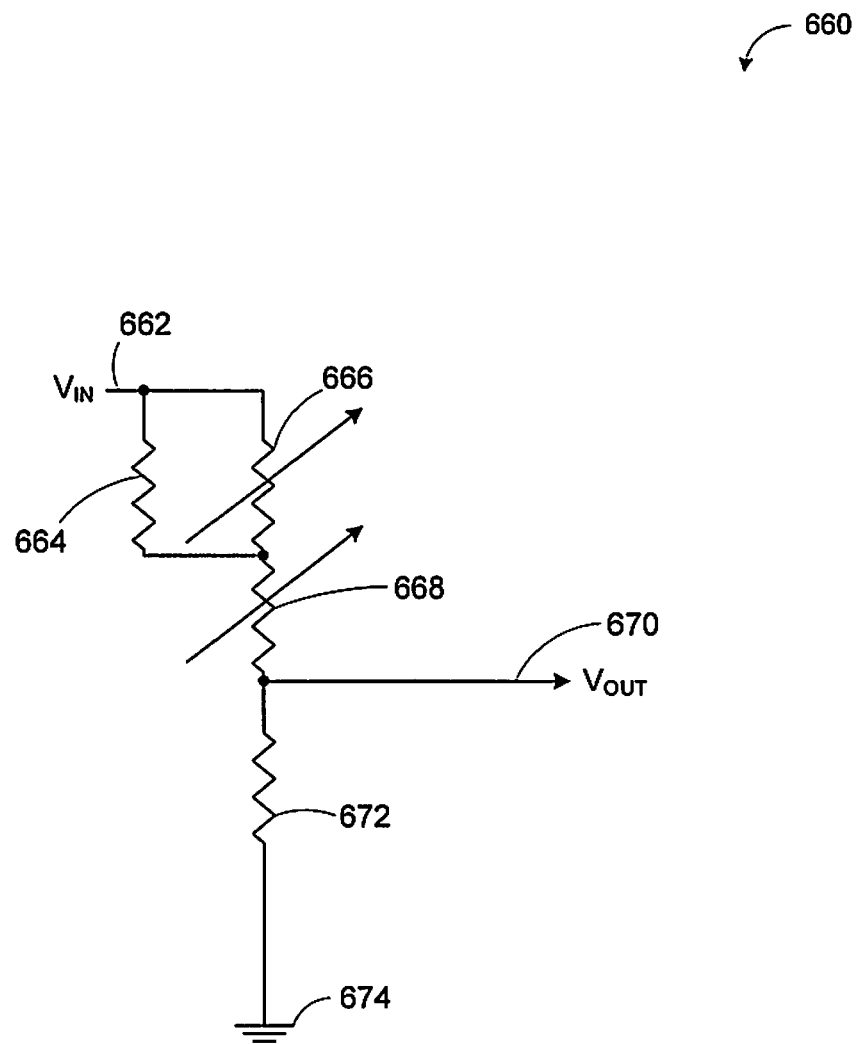

FIGS. 6A-6C illustrate examples of thermistor voltage dividers that may be coupled to a control terminal of a linear mode transistor parallel to a color string in the electric circuit 100 of FIG. 1. FIG. 6A illustrates a thermistor voltage divider 600 that may be coupled to a control terminal of a linear mode transistor parallel to a color string in the electric circuit 100. The thermistor voltage divider 600 includes an input terminal 602 electrically coupled to a control device, such as the control device 102 of FIG. 1. In this example, a thermistor 604 is also electrically coupled to the input terminal 602. On the other end of the thermistor 604 from the input terminal 602 is an output terminal 606. The output terminal 606 is coupled to the control terminal of the linear mode transistor. The output terminal 606 also electrically couple to a resistor 610, with the other end of the resistor 610 electrically coupled to a circuit ground 612.

FIG. 6B illustrates a thermistor voltage divider 630 that may be coupled to a control terminal of a linear mode transistor parallel to a color string in the electric circuit 100. The thermistor voltage divider 630 includes an input terminal 632 electrically coupled to a control device, such as the control device 102. In this example, the input terminal 632 is electrically coupled to a first resistor 634 in parallel with a thermistor 636. The first resistor 634 in parallel with the thermistor 636 is also electrically coupled to an output terminal 638 on the opposite end from the input terminal 632. The output terminal 638 is electrically coupled to a second resistor 640, with the other end of the second resistor 640 electrically coupled to a circuit ground 642.

FIG. 6C illustrates a thermistor voltage divider 660 that may be coupled to a control terminal of a linear mode transistor parallel to a color string in the electric circuit 100. The thermistor voltage divider 660 includes an input terminal 662 electrically couple to a control device, such as the control device 102. In this example, the input terminal 662 is electrically coupled to a first resistor 664 in parallel with a first thermistor 666. The first resistor 664 in parallel with the first thermistor 666 is also electrically coupled to a second thermistor 668 with the other terminal of the second thermistor 668 coupled to an output terminal 670. The output terminal 670 is electrically coupled to a second resistor 672, with the other end of the second resistor 672 electrically coupled to a circuit ground 674.

The thermistors (e.g. thermistors 604, 636, 666, and 668) in the examples of FIGS. 6A-6C may be placed physically close to LEDs in the color string away from any thermal regulators or heat dissipaters to accurately measure the operating temperatures of the color string. The thermistor voltage dividers are utilized to account for differences in color ratios under different operating temperatures. Some color stings need more compensation than the others. For example, a red LED color string may require more compensation than a blue LED color string. The thermistor voltage dividers have the unexpected advantage of providing dimming operations for a LED-based lamp that simulates a blackbody emitter and can operate under different operating temperatures.

Figure 7:
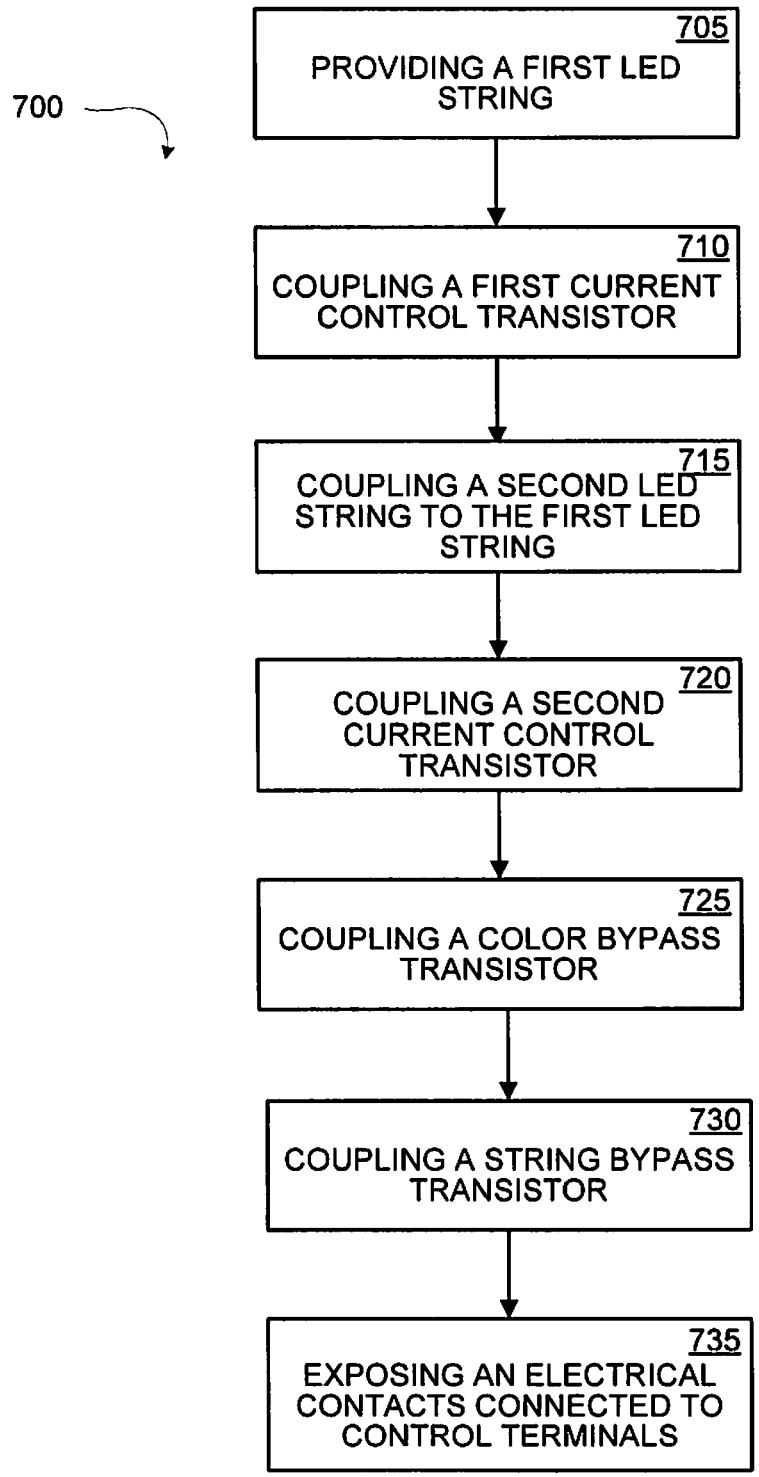
FIG. 7 illustrates a flow chart of a method of manufacturing an electrical circuit for driving a LED based lamp.

FIG. 7 illustrates a flow chart of a method 700 of manufacturing an electrical circuit, such as the electrical circuit 100 or the electrical circuit 200, for driving a LED based lamp. The method 700 includes driving a first light emitting diode (LED) string including at least one LED with a power supply in a step 705; driving a second LED string including one or more color strings with the power supply in a step 710, each of the one or more color strings including at least one LED, the one or more color strings coupled in series, the first LED string and the second LED string electrically coupled at an anode terminal of both the first LED string and the second LED string; operating a first transistor in linear mode, the first transistor electrically coupled to the first LED string in series in a step 715; operating a second transistor in linear mode in a step 720, the second transistor electrically coupled to the second LED string in series; and operating a color bypass transistor in linear mode in a step 725, the color bypass transistor electrically coupled to a particular color string of the one or more color strings, the color bypass transistor coupled in parallel to the particular color string.

The method 700 further includes coupling a string bypass transistor in parallel to the first LED string in a step 730 and exposing electrical contacts connected to control terminals of the first transistor, the second transistor, the string bypass transistor, and the color bypass transistor in a step 735.

Figure 8:
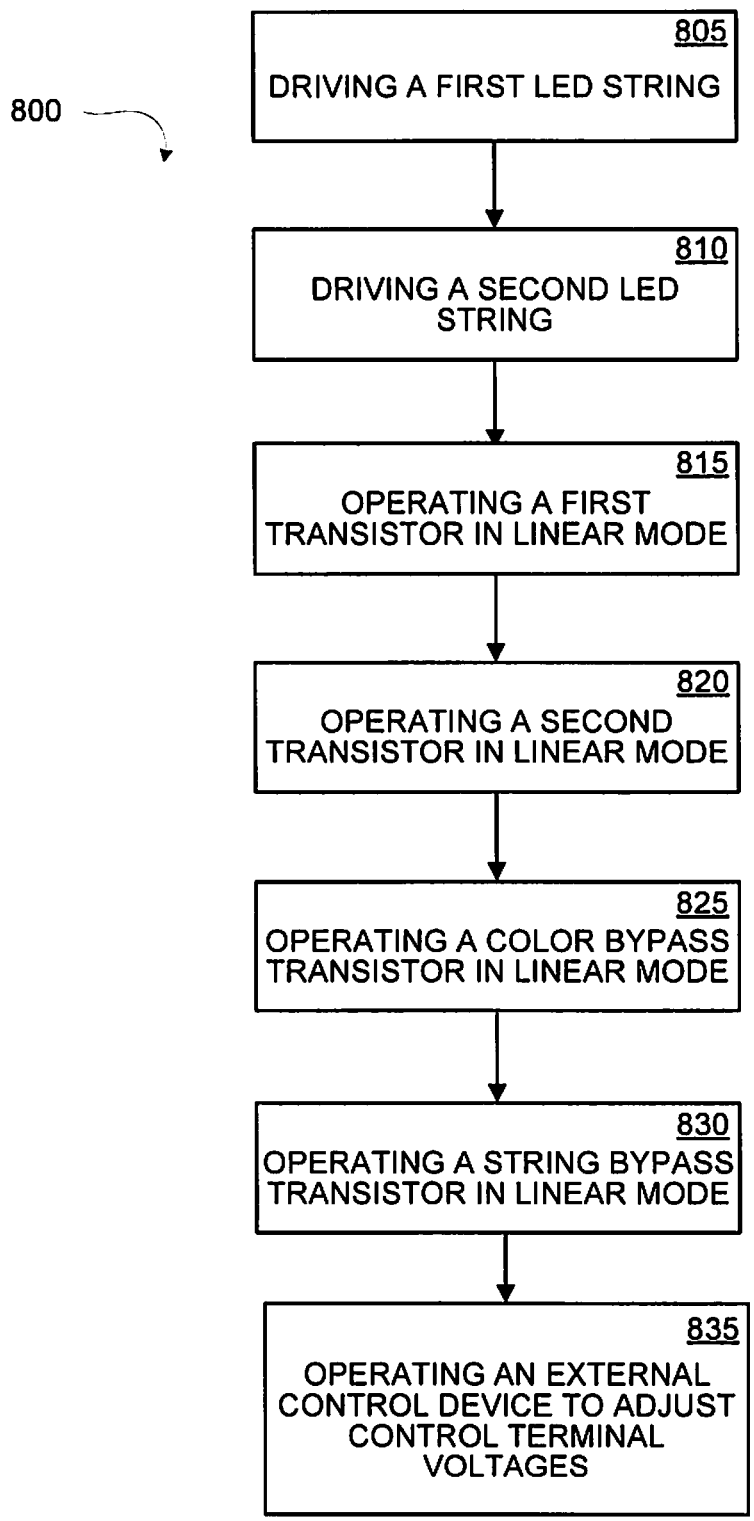
FIG. 8 illustrates a flow chart of a method of operating an electrical circuit for driving a LED based lamp.

FIG. 8 illustrates a flow chart of a method 800 of operating an electrical circuit, such as the electrical circuit 100 or the electrical circuit 200, for driving a LED based lamp. The method 800 includes driving a first light emitting diode (LED) string including at least one LED with a power supply in a step 805; driving a second LED string including one or more color strings with the power supply in a step 810, each of the one or more color strings including at least one LED, the one or more color strings coupled in series, the first LED string and the second LED string electrically coupled at an anode terminal of both the first LED string and the second LED string; operating a first transistor in linear mode in a step 815, the first transistor electrically coupled to the first LED string in series; operating a second transistor in linear mode in a step 820, the second transistor electrically coupled to the second LED string in series; and operating a color bypass transistor in linear mode in a step 825, the color bypass transistor electrically coupled to a particular color string of the one or more color strings, the bypass transistor coupled in parallel to the particular color string. The method 800 further includes operating a string bypass transistor in linear mode in a step 830, the string bypass transistor electrically coupled in parallel with the first LED string; and operating a control device to adjust control terminal voltages at each of control terminals of the color bypass transistor, the first linear transistor, the second linear transistor, or the string bypass transistor in a step 835.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

In this disclosure, a circuit element is "coupled" to another circuit element when the two circuit elements are electrically connected. A first circuit element is "in series" with a second circuit element if electrical current passes through both circuit elements in turn without branching. A first circuit element is "in parallel" with a second circuit element if electrical current is divided into two or more paths including the first circuit element and the second circuit element before recombining to complete the circuit later.

What is claimed is:

1. A method of manufacturing an electrical circuit for driving a light emitting diode (LED) based lamp comprising:
   providing a first LED string including one or more LEDs;
   electrically coupling a first current control transistor to the first LED string in series with the first LED string, the first current control transistor capable of operating in a linear mode for current to flow through the first LED string and the first current control transistor;
   electrically coupling a second LED string to the first LED string at an anode terminal of both the first LED string and the second LED string, the second LED string including one or more color strings, each of the one or more color strings including at least one LED, the one or more color strings coupled in series;
   electrically coupling a second current control transistor in series with the second LED string, the second current control transistor capable of operating in a linear mode for current to flow through the second LED string and the second current control transistor;
   electrically coupling a color bypass transistor in parallel to a particular color string of the one or more color strings, the color bypass transistor capable of operating in a linear mode for the color bypass transistor to bypass at least a portion of current through the particular color string; and
   electrically coupling a control device to the first current control transistor and the second current control transistor, the control device capable of switching a voltage ratio between control terminals of the first current control transistor and the second current control transistor, wherein the control device includes a potentiometer or a mechanical switch coupled to a voltage divider.

2. The method of claim 1, further comprising electrically coupling a string bypass transistor in parallel to the first LED string.

3. The method of claim 2, further comprising exposing an electrical contact connected to a control terminal of the string bypass transistor for electrical connection to the control device.

4. The method of claim 1, further comprising exposing an electrical contact connected to a control terminal of the color bypass transistor for electrical connection to the control device.

5. The method of claim 1, further comprising exposing an electrical contact connected to a control terminal of the first current control transistor for electrical connection to the control device.

6. A method of operating an electrical circuit for driving a light emitting diode (LED) based lamp comprising:
   driving a first light emitting diode (LED) string including at least one LED with a power supply;
   driving a second LED string including one or more color strings with the power supply, each of the one or more color strings including at least one LED, the one or more color strings electrically coupled in series, the first LED string and the second LED string electrically coupled at an anode terminal of both the first LED string and the second LED string;
   operating a first transistor in linear mode, the first transistor electrically coupled to the first LED string in series;
   operating a second transistor in linear mode, the second transistor electrically coupled to the second LED string in series; and operating a color bypass transistor in linear mode, the color bypass transistor electrically coupled to a particular color string of the one or more color strings, the bypass transistor electrically coupled in parallel to the particular color string; and
   operating a control device to change ratios of voltages applied on control terminals of the first transistor and the second transistor to adjust a ratio of electric currents passing through the first LED string and the second LED string, the control device being an analog function generator having a voltage reference to at least one of the first LED string or the second LED string.

7. The method of claim 6, wherein the analog function generator is configured to produce an output voltage signal to at least one of the control terminals; and wherein the output voltage signal is substantially linearly correlated to the voltage reference and a slope of the output voltage signal with respect to the voltage reference changes in steps.

8. The method of claim 6, wherein the ratios of voltage are configured to produce a combined illumination from the first LED string and the second LED string along the Planckian locus.

9. The method of claim 6, further comprising operating another control device to adjust a voltage applied on a control terminal of the color bypass transistor to adjust a color composition produced by the second LED string.

10. The method of claim 9, wherein operating the other control device includes switching the voltage to apply on the control terminal of the color bypass transistor to increase a color rendering index (CRI) of a combined illumination produced by the second LED string and the first LED string.

11. The method of claim 6, further comprising controlling the first transistor and the second transistor such that at least one of the first transistor or the second transistor is on during operation.

12. A lighting apparatus comprising:
   a first light emitting diode (LED) string including at least one LED;
   a first transistor electrically coupled to the first LED string in series, the first transistor capable of operating in a linear mode;
   a second LED string including one or more color strings, each of the one or more color strings including at least one LED, the one or more color strings electrically coupled in series, the first LED string and the second LED string electrically coupled at an anode terminal of both the first LED string and the second LED string;
   a second transistor electrically coupled to the second LED string in series, the second transistor capable of operating in a linear mode; and
   a color bypass transistor electrically coupled to a particular color string of the one or more color strings in parallel, the color bypass transistor capable of operating in a linear mode; and
   a control device electrically coupled to the color bypass transistor, the control device capable of switching a voltage applied to a control terminal of the color bypass transistor, wherein the control device includes a potentiometer or a mechanical switch coupled to a voltage divider.

13. The electrical circuit of claim 12, wherein the first LED string is a single color LED string.

14. The electrical circuit of claim 12, wherein the second LED string is a multi-color LED string for producing a combined illumination that is substantially white.

15. The electrical circuit of claim 12, further comprising a detachable power supply.

16. The electrical circuit of claim 12, further comprising another control device electrically coupled to the first transistor and the second transistor, the other control device capable of switching a voltage ratio between control terminals of the first transistor and the second transistor.

17. The electrical circuit of claim 16, wherein the other control device includes a potentiometer or a mechanical switch coupled to a voltage divider.

18. The electrical circuit of claim 12, further comprising additional bypass transistors electrically coupled in parallel to each of the one or more color strings of the second LED string.

19. The electrical circuit of claim 12, further comprising at least an other control device electrically coupled to the additional bypass transistors, the other control device capable of switching voltages applied to control terminals of the additional bypass transistors.

20. The electrical circuit of claim 12, further comprising an additional string bypass transistor electrically coupled in parallel to the first LED string at both terminals of the first LED string.

21. The electrical circuit of claim 20, further comprising another control device electrically coupled to the additional string bypass transistor, the other control device capable of switching a voltage applied to a control terminal of the additional string bypass transistor.

22. An electrical circuit comprising:
  a light emitting diode (LED) string including multiple color strings, the multiple color strings electrically coupled in series, each including at least one LED;
  a set of color bypass transistors electrically coupled each of the multiple color strings in parallel, each of the color bypass transistors capable of operating in a linear mode and diverting a portion of current from each of the multiple color strings;
  a control device electrically coupled to control terminals of the set of color bypass transistors to switch between voltages applied to the control terminals of the color bypass transistors;
  wherein the control device adjust the voltages applied such that current ratio through the multiple color strings produces illumination substantially tracking color intensity ratios along the Planckian locus in a chromaticity space; and
  a first voltage divider including a first thermister therein, the first voltage divider electrically coupled between the control device and at least one of the control terminals of the color bypass transistors; wherein the first thermister is adjacent to an LED in the LED string.

23. The electrical circuit of claim 22, further comprising a current control transistor electrically coupled to the LED string in series, the current control transistor capable of operating in a linear mode; wherein the control device is electrically coupled to a control terminal the current control transistor.

24. The electrical circuit of claim 22, wherein the multiple color stings are substantially non-white colors including a red color string, an amber color string, a blue color string, or any combination thereof.

25. The electrical circuit of claim 22, further comprising a substantially white LED string coupled in parallel to a single linear bypass transistor controlled by the control device.

26. The electrical circuit of claim 22, further comprising a resistor electrically coupled in series with the LED string to a circuit ground, wherein a voltage reference between the LED string and the resistor is electrically coupled to the control device.

27. The electrical circuit of claim 26, wherein the control device is an analog function generator having the voltage reference as an input.

28. The electrical circuit of claim 27, wherein the analog function generator is configured to produce an output voltage signal to at least one of the control terminals;
  and wherein the output voltage signal is substantially linearly correlated to the voltage reference and a slope of the output voltage signal with respect to the voltage reference changes in steps.

29. The electrical circuit of claim 26, further comprising an adjustable current source coupled to the LED string to drive the LED string; wherein the control device is configured to be controlled by the adjustable current source via the voltage reference.

30. The electrical circuit of claim 22, further comprising a second voltage divider including a second thermister of different resistance from the first thermistor, the second thermistor electrically coupled between the control device and at least one of the control terminals.

31. An electrical circuit comprising:
  a light emitting diode (LED) string including multiple color strings, the multiple color strings electrically coupled in series, each including at least one LED;
  a set of color bypass transistors electrically coupled each of the multiple color strings in parallel, each of the color bypass transistors capable of operating in a linear mode and diverting a portion of current from each of the multiple color strings;
  a control device electrically coupled to control terminals of the set of color bypass transistors to switch between voltages applied to the control terminals of the color bypass transistors;
  wherein the control device adjust the voltages applied such that current ratio through the multiple color strings produces illumination substantially tracking color intensity ratios along the Planckian locus in a chromaticity space;
  a resistor electrically coupled in series with the LED string to a circuit ground, wherein a voltage reference between the LED string and the resistor is electrically coupled to the control device; and
  an adjustable current source coupled to the LED string to drive the LED string; wherein the control device is configured to be controlled by the adjustable current source via the voltage reference.

* * * * *